Patented June 17, 1947

2,422,619

UNITED STATES PATENT OFFICE 2,422,619

VITAMIN B₆ INTERMEDIATES

Stanton A. Harris, Westfield, N. J., assignor to Merck & Co., Inc., Rahway, N. J., a corporation of New Jersey No Drawing. Application July 28, 1944, Serial No. 547,104

18 Claims. (Cl. 260—296)

This application relates generally to a process for the preparation of novel chemical compounds; in a particular sense it is concerned with the preparation of intermediates useful in the synthesis of vitamin B₆ (3-hydroxy-4,5-di(hydroxymethyl)-2-methyl-pyridine).

This application is a continuation-in-part of the copending application by the same inventor, Serial No. 428,080 filed January 24, 1942, which is a division of Serial No. 293,131 filed September 1, 1939, issued February 10, 1942, as Patent No. 2,272,198.

The compounds forming the subject matter of the present invention are represented by the formula:

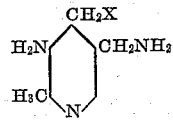

wherein X is hydroxyl or a halogen, and salts thereof.

According to one embodiment of the present invention, a compound of the above formula wherein X is hydroxyl, namely 2-methyl-3-amino-4-hydroxymethyl-5-aminomethylpyridine, is obtained by hydrolysis of compounds of the formula:

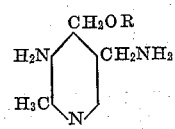

wherein R is an alkyl, aryl, or aralkyl group. Hydrolysis of these compounds, for example with dilute acids, yields corresponding acid salts of 2-methyl-3-amino-4-hydroxymethyl-5-aminomethylpyridine which are converted to the free base by conventional operations such as treatment with alkali.

According to another embodiment of the invention, the compound is obtained by hydrolysis of a 2-methyl-3-amino-4-halogenmethyl-5-aminomethylpyridine salt to form the corresponding salt of 2-methyl-3-amino-4-hydroxymethyl-5-aminomethylpyridine.

The compound, 2-methyl-3-amino-4-halogenmethyl-5-aminomethylpyridine, is produced in accordance with the present invention by treating, preferably with a concentrated hydrohalic acid solution, a compound of the formula:

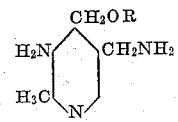

wherein R is as above, to form the hydrohalide salt which is then converted to the free base by usual operations.

The following examples illustrate methods of carrying out the present invention but it is to be understood that these examples are given by way of illustration and not of limitation.

Example I

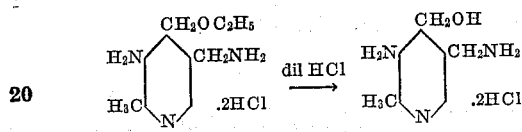

About 2.24 g. of 2-methyl-3-amino-4-ethoxymethyl-5-aminomethylpyridine dihydrochloride is added to 34 cc. of hydrochloric acid (2.5N) and heated at 175–180° C. for about four hours. The solution is then treated with activated carbon, filtered, and concentrated to dryness under reduced pressure. The residue containing the dihydrochloride of 2-methyl-3-amino-4-hydroxymethyl-5-aminomethylpyridine (M. P. 235–237° C.) is purified by recrystallization from water and alcohol.

In like manner, 2-methyl-3-amino-4-benzyloxymethyl-5-aminomethylpyridine and 2-methyl-3-amino-4-phenoxymethyl-5-amino-methyl-pyridine can be hydrolyzed to obtain 2-methyl-3-amino-4-hydroxymethyl-5-aminomethylpyridine.

Example II

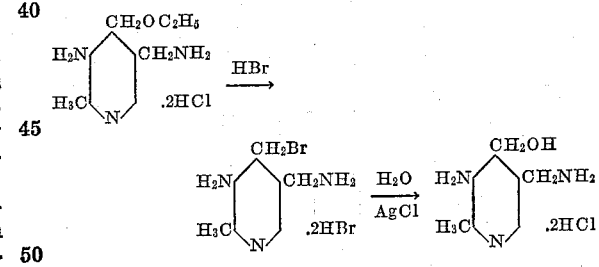

About 1.55 g. of the dihydrochloride of 2-methyl-3-amino-4-ethoxymethyl-5-amino-methylpyridine are dissolved in 20 cc. of hydrobromic acid (48-48%) and distilled until about one-half of the acid is distilled over. The concentrate is cooled, allowed to crystallize, and the product removed and purified by conventional operations to yield 2-methyl-3-amino-4-bromomethyl-5-aminomethylpyridine dihydrobromide (M. P. about 260-265° C.).

About 1 g. of the compound so obtained is dissolved in 100 cc. of water and heated for 1 to 2 hours at about 100° C. The mixture is treated with activated carbon and with silver chloride and then filtered. The filtrate is concentrated under diminished pressure to incipient crystallization, and the product allowed to crystallize. The product is removed and purified by known methods to obtain 2-methyl-3-amino-4-hydroxymethyl-5-aminomethylpyridine dihydrochloride.

Similarly, 2-methyl-3-amino-4 benzyloxymethyl-5-amino-methylpyridine and 2-methyl-3-amino-4-phenoxymethyl-5-aminomethylpyridine can be treated with other hydrohalic acids to obtain 2-methyl-3-amino-4-halogenmethyl-5-aminomethylpyridine.

The free bases corresponding to 2-methyl-3-amino-4-hydroxymethyl-5-aminomethylpyridine and 2-methyl-3-amino-4-halogenmethyl-5-aminomethylpyridine are obtained by treating the acid salts with alkali, evaporating to dryness, and extracting with an organic solvent such as alcohol or acetone.

Modifications may be made in carrying out the present invention without departing from the spirit and scope thereof and the invention is to be limited only by the appended claims.

What is claimed is:

1. A compound of the formula:

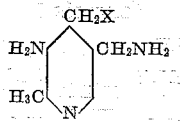

wherein X is selected from the group consisting of halogen and hydroxyl; and salts thereof.

2. A compound of the formula:

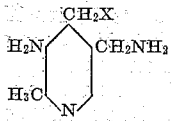

wherein X is halogen; and salts thereof.

3. A compound of the formula:

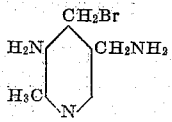

and salts thereof.

4. A compound of the formula:

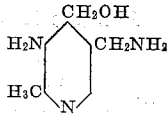

and salts thereof.

5. A compound of the formula:

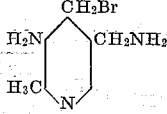

and hydrohalide salts thereof.

6. A compound of the formula

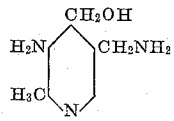

and hydrohalide salts thereof.

7. The process that comprises reacting a compound of the formula

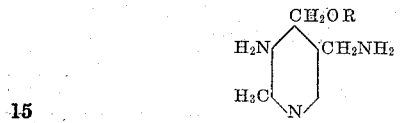

wherein R is selected from the class consisting of alkyl, aryl, and aralkyl groups with a hydrohalic acid to obtain a hydrohalide of 2-methyl-3-amino-4-halogenmethyl-5-aminomethylpyridine, and removing the hydrohalide to produce 2-methyl-3-amino-4-halogenmethyl-5-aminomethylpyridine.

8. The process that comprises reacting a compound of the formula

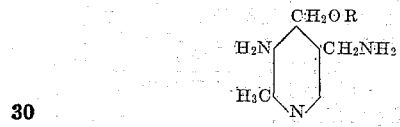

wherein R is alkyl with a hydrohalic acid to obtain a hydrohalide of 2-methyl-3-amino-4-halogenmethyl-5-aminomethylpyridine, and removing the hydrohalide to produce 2-methyl-3-amino-4-halogenmethyl-5-aminomethylpyridine.

9. The process that comprises reacting a compound of the formula

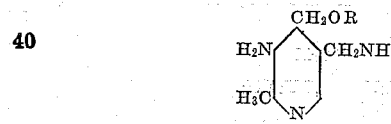

wherein R is aryl with a hydrohalic acid to obtain a hydrohalide of 2-methyl-3-amino-4-halogenmethyl-5-aminomethylpyridine, and removing the hydrohalide to produce 2-methyl-3-amino-4-halogenmethyl-5-aminomethylpyridine.

10. The process that comprises reacting a compound of the formula

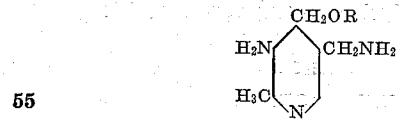

wherein R is aralkyl with a hydrohalic acid to obtain a hydrohalide of 2-methyl-3-amino-4-halogenmethyl-5-aminomethylpyridine, and removing the hydrohalide to produce 2-methyl-3-amino-4-halogenmethyl-5-aminomethylpyridine.

11. The process that comprises reacting 2-methyl-3-amino-4-ethoxymethyl-5-aminomethylpyridine with a hydrohalic acid to obtain a hydrohalide of 2-methyl-3-amino-4-halogenmethyl-5-aminomethylpyridine, and removing the hydrohalide to produce 2-methyl-3-amino-4-halogenmethyl-5-aminomethylpyridine.

12. The process that comprises reacting 2-methyl-3-amino-4-ethoxymethyl-5-aminomethylpyridine with hydrobromic acid to obtain a hydrohalide of 2-methyl-3-amino-4-bromomethyl-5-aminomethylpyridine, and removing the hydrohalide to produce 2-methyl-3-amino-4-bromomethyl-5-aminomethylpyridine.

13. The process that comprises hydrolyzing a compound of the formula

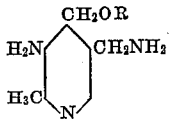

wherein R is selected from the class consisting of alkyl, aryl, and aralkyl groups to obtain the acid salt of 2-methyl-3-amino-4-hydroxymethyl-5-aminomethylpyridine, and treating this compound with alkali to obtain 2-methyl-3-amino-4-hydroxymethyl-5-aminomethylpyridine.

14. The process that comprises hydrolyzing a compound of the formula

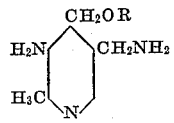

wherein R is alkyl to obtain the acid salt of 2-methyl - 3 - amino-4- hydroxymethyl - 5 - aminomethylpyridine, and treating this compound with alkali to obtain 2-methyl-3-amino-4-hydroxymethyl-5-aminomethylpyridine.

15. The process that comprises hydrolyzing a compound of the formula

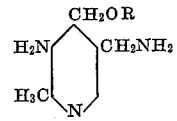

wherein R is aryl to obtain the acid salt of 2-methyl - 3 - amino - 4 - hydroxymethyl-5-aminomethylpyridine, and treating this compound with alkali to obtain 2-methyl-3-amino-4-hydroxymethyl-5-aminomethylpyridine.

16. The process that comprises hydrolyzing a compound of the formula

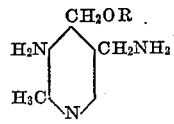

wherein R is aralkyl to obtain the acid salt of 2-methyl-3-amino - 4 - hydroxymethyl - 5 - aminomethylpyridine, and treating this compound with alkali to obtain 2-methyl-3-amino-4-hydroxymethyl-5-aminomethylpyridine.

17. The process that comprises hydrolyzing 2-methyl - 3 - amino - 4 - ethoxymethyl - 5 - aminomethylpyridine to obtain the acid salt of 2-methyl-3-amino-4-hydroxymethyl - 5 - aminomethylpyridine, and treating this compound with alkali to obtain 2-methyl-3-amino-4-hydroxymethyl-5-aminomethylpyridine.

18. The process that comprises treating 2-methyl - 3 - amino - 4 - ethoxymethyl - 5 -aminomethylpyridine with hydrochloric acid to obtain the hydrochloride of 2-methyl-3-amino-4-hydroxymethyl-5-aminomethylpyridine, and treating this compound with alkali to obtain 2-methyl-3-amino-4-hydroxymethyl - 5 - aminomethylpyridine.

STANTON A. HARRIS.